Figure 1:
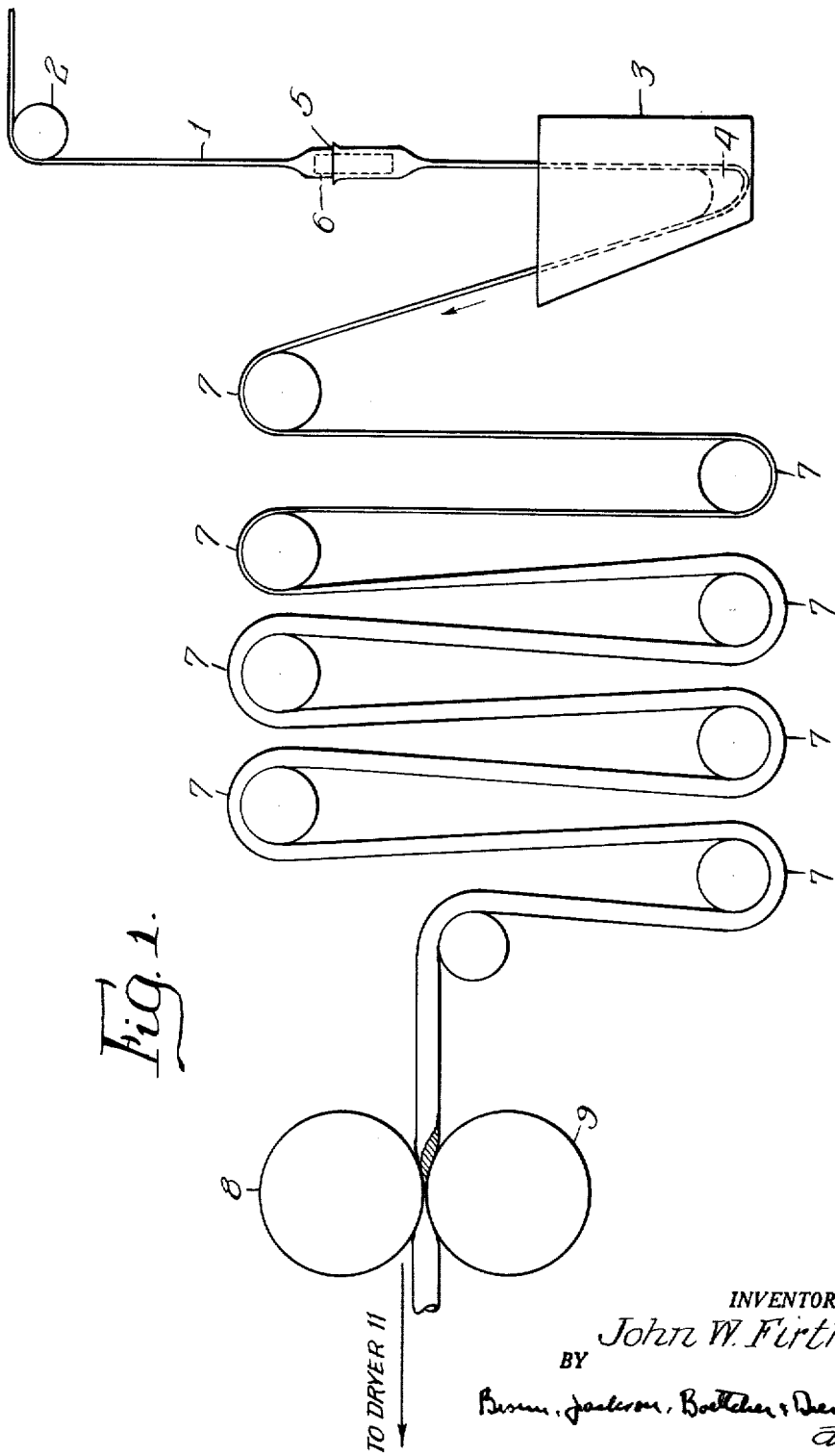

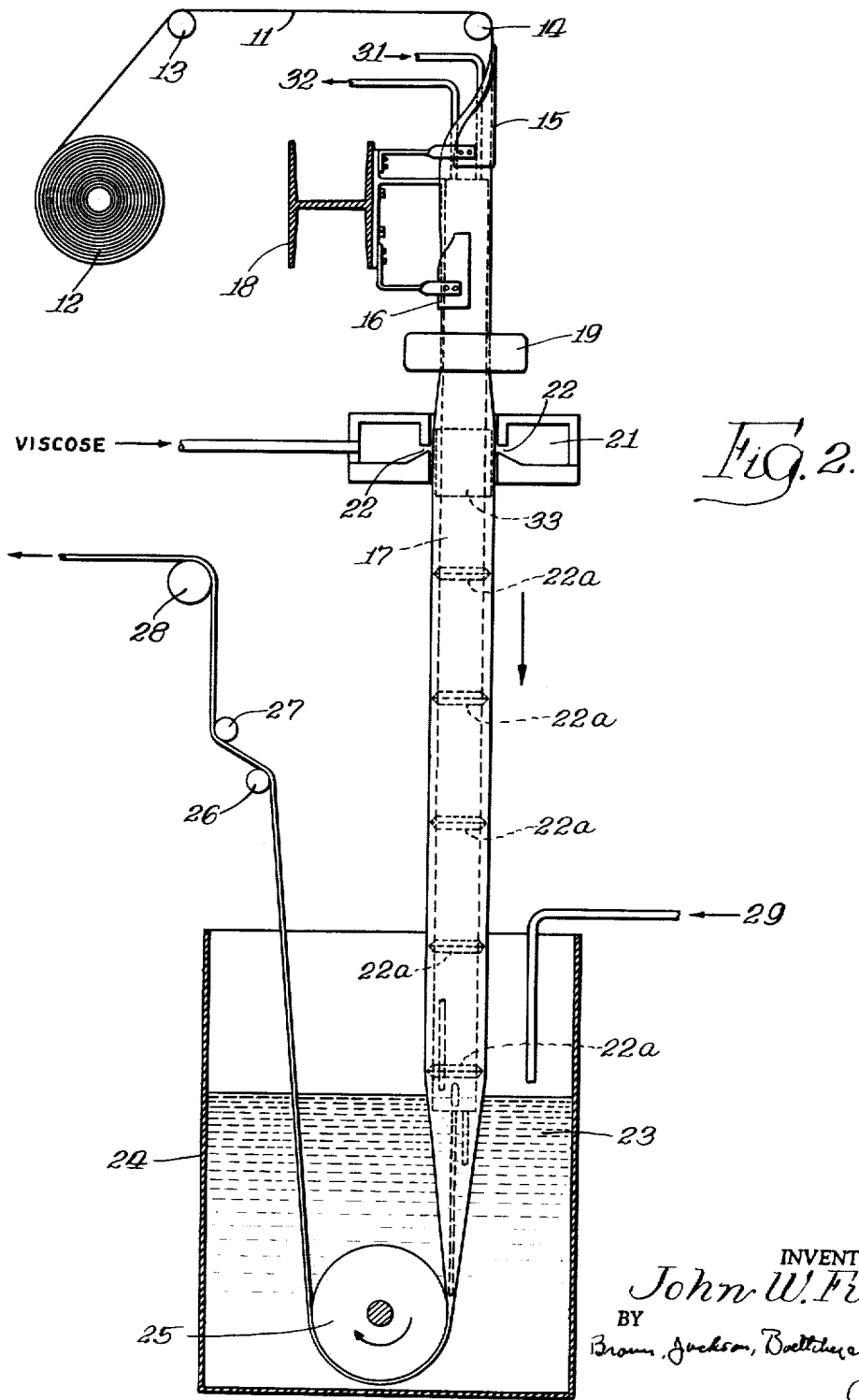

3,106,471
METHOD OF PRODUCING SAUSAGE AND MEAT CASING EMPLOYED THEREIN
John W. Firth, Chicago, Ill., assignor to Tee-Pak, Inc., Chicago, Ill., a corporation of Illinois
Filed Jan. 24, 1958, Ser. No. 710,916
12 Claims. (Cl. 99—109)

This invention relates to the production of sausage items, particularly of sausages of the type made by stuffing a casing with sausage emulsion, processing the encased product—as by cooking, smoking and curing, then removing the casing, slicing the sausage and packaging the resulting sliced product.

There has been great consumer acceptance of the "pre-sliced" sausage like bologna, which is sold in the form of relatively small, conveniently sized packages, each package containing, as an example, four ounces of sausage in the form of a fixed number of slices. The rapid rise in popularity and volume of such packaged sausage has however, been accompanied by a number of difficulties and problems on the part of the meat packer. For example, in order to provide a predetermined number of slices of bologna sausage in an eight ounce package, it is essential that the "in-process" treatment of the bologna be such that the density, diameter and other physical dimensions, as well as the surface appearance of the sausage be carefully controlled. The reason for this is that the slicing is performed mechanically, and for high speed packaging which is a sine qua non today, it is absolutely essential that the dimensional variations of the sausage from which the sliced components of the finished package are formed, be held to an absolute minimum. Probably the most widely used material for "in-process" casing use is what is known in the trade as fibrous casing; it is composed of cellulosic fibers which are impregnated and held together by regenerated cellulose and represents probably the great bulk of artificial casings used by the packer for producing pre-sliced packaged sausage, like bologna. Unfortunately one of the great inherent deficiencies of fibrous casings in particular and of other types of casings such as natural and artificial casings in general, is that the sausage emulsion has a tendency to stick or adhere to the inside surface of the casing within which it is contained.

Many attempts to solve this problem have been made in the past, but no completely satisfactory solution has thus far been found; among the techniques suggested in the past for minimizing this "casing adhesion" problem has been to coat the inside of the casing, prior to its being stuffed with sausage emulsion, with fatty or waxy materials of one kind or another. While these do provide some relief the problem has by no means been solved completely since there is still too much adhesion of meat to casing; additionally, some of the materials suggested have been of questionable toxicity or have had a tendency to impart undesirable odors, flavors or colors, either to the casing or to the meat product within it. Furthermore, the use of wax and waxy materials such as suggested in the past frequently was found to have a deleterious effect on the necessary permeability of the casing to moisture vapor, smoke, dyeing and the like.

It may be pointed out that casing adhesion problem does not involve merely aesthetic values, but that actual losses of food materials are involved. For example, casing which has been stripped from a bologna prior to slicing may contain a substantial (and expensive—considering the cost of bologna) amount of sausage which adheres to the inside of the casing and which is tossed away as waste with the stripped-off casing. A further waste factor is that if the surface of the stripped sausage is too eroded due to the adhesion of the casing to the surface thereof, it frequently is necessary to rework the sausage into a batch of sausage emulsion. Such reworking involves not only additional cost, but may result in an inferior finished product as is well recognized in the art.

In brief, it is seen that the present day casing used in the particular type of sausage production which is intended to produce pre-sliced packages does not perform to complete satisfaction in at least this one important particular under the critical demands of quality conscious consumers as well as of high speed production techniques.

I have now found that casings can be produced which will not adhere to the sausage emulsion encased therein and which after processing can be readily peeled off from the encased sausages without mutilation of the meat surface.

In the practice of my invention, the inside surface of sausage casing, or if the casing is made by forming sheet material into a tube then the surface of the sheet which will become the inside of the tube or casing, is subjected to contact with an aqueous emulsion containing as an essential material a dimer of a higher ketene which ketene may have, for example, from about 6 to 20 carbon atoms, and have attached to the $>C=C=O$ group, members of the class consisting of hydrogen and hydrocarbon radicals. Also included are ketenes having from 6 to 20 carbon atoms and having attached to the

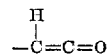

group an alkyl radical, as well as ketenes having from about 6 to 20 carbon atoms and having attached to the $>C=C=O$ group only alkyl radicals. The most preferable ketene dimers are those which are solid at normal temperatures. Such compositions and the production of emulsions thereof are further described in detail in U.S. Patent No. 2,762,270, in particular hexyl ketene dimer, decyl ketene dimer, hexadecyl ketene dimer, dodecyl ketene dimer, tetradecyl ketene dimer, octadecyl ketene dimer, dimers of mixtures of ketenes obtainable from fats, oils and the like, as well as dimers of monomeric monoalkyl and monoaryl ketenes, dialkyl ketenes, diaryl ketenes, arylalkyl ketenes, and mono- and dialicyclic ketenes and the like including, for example, phenyl ketene, dioctyl ketene, decyl phenyl ketene and cyclohexyl ketene. A commercially available product typifying the foregoing is Aquapel No. 380 which I found to be very effective for the purpose of my invention.

Aquapel 380 is composed of alkyl ketene dimers containing in admixture a small amount of water miscible emulsifying agent. The product as sold is a flaked white solid which has an apparent molecular weight of about 530, a melting point of 110° F. and a bulk density of about 25 pounds per cubic foot in flake form, contains about 17 carbons in the ketene monomer and is prepared from saturated higher fatty acids.

In use the ketene dimer, preferably as an aqueous emulsion, is applied to the ultimate meat-contacting surface of the casing (or sheet material from which casing is to be formed) so that an amount between about 0.01 and 0.2% of ketene dimer based on the weight of the casing is incorporated in the casing; lesser or greater amounts may be used if desired, although, generally very slight or very great amounts do not materially increase the effectiveness of the treatment. After application of the coating the casing is heated to remove water and accelerate the reaction between the coating and the casing surface, the drying being, desirably, sufficient to reduce moisture content of the casing down to 10% and preferably 5%.

The coating of ketene dimer can be applied to the casing surface in any desired way. Thus, application to conventional regenerated cellulose casing, fibrous casing, or any other kind of casing can be made by coating the inside surfaces of the tubular casings by a technique which involves the use of a "bubble" of aqueous solution, emulsion, or suspension of the ketene dimer inside the tube, which moves so that while the bubble of liquid remains still, the tubular surfaces around it are wetted and then move on beyond the bubble to a drying atmosphere.

This technique is better illustrated in the following description of the use of the aforesaid technique as applied to a commercial production line of either regenerated cellulose tubing or casing, or what is known as "fibrous casing."

Referring to FIGURE 1 of the drawing, casing which may be wet fibrous casing or wet regenerated cellulose casing 1 in a collapsed flat form is transferred from a bath (not shown) in which the casing has been washed after being impregnated with viscose followed by regeneration, or in the case of regenerated cellulose casing after regeneration (both of these being well known procedures for the production of fibrous or regenerated cellulose casing), into a slack box 3, by passage over "carry over rolls" 2. Between the rolls 2 and the slack box 3 an aqueous emulsion containing from 0.01 to 1.0% of Aquapel 380, preferably 0.1% to 1.0%, and about 0.5% of sodium bicarbonate, is placed within the casing 1, the emulsion being admitted through a cut 5 in the casing 1 before "rubber couplers" 6 are tied into the casing 1. The emulsion can be made by heating water to about 60° C., and in any event above the melting point of the organic ketene dimer, then adding the latter with agitation. The temperature of the water is reduced below the melting point of the ketene dimer to about 35–40° C., and about 0.5%, of sodium bicarbonate based on the total weight of the water plus ketene dimer, is added. The resulting emulsion is ready for use at this temperature.

The bubble 4 of the emulsion lies at the bottom of the slack box 3 and as the casing 1 moves as shown, the interior of the casing 1 is progressively contacted with the bubble 4, and is forced open to conform to the configuration of bubble 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is dried further at a temperature of 200° F. for about 5 minutes. In this last drying stage the ketene dimer continues and/or completes its integration with the casing due, presumably, to reaction between the ketene dimer and the casing surface in contact therewith.

While 0.5% of sodium bicarbonate is a convenient amount and kind of alkaline material used under the particular conditions described, other amounts and kinds of alkaline buffers can be, of course, used, with the desiderata being the obtention of dried casing which is neutral or slightly alkaline. Any well-known alkaline buffer which will bring the pH of the emulsion of ketene dimer to about from 7.7 to 8.0 is useable. The advantage of having the inside of the casing at a slightly alkaline, or a neutral condition, is that reaction of ketene dimer with casing is best at these pH's.

Wet regenerated cellulose casing coming off the production line may have a pH, due to residual acid content, of for example, 6.8 to 7.2. With the pH of the ketene dimer—containing aqueous "bubble" at 7.8 to 8.0, the pH of the resulting casing, after drying will range from about 7.6 to 8.2.

The drying time and temperature are interdependent factors insofar as effecting the drying of the casing and reaction of the dimer with the casing surface are concerned, as will be apparent to those skilled in the art. Other combinations of time and temperature besides those illustrated above can be used, provided, of course, that the temperature is not so high and time not so long that the casing itself is injured due to weakening, discoloration, embrittlement or the like. For the best results a temperature of about 175° F. or higher should be used.

Under the above described conditions, a number of runs were made, using fibrous casing as the casing being treated, as follows:

EXAMPLE I

Various sizes of casings were coated on the inside using the above-described application technique, the coating fluid containing besides the sodium bicarbonate, various concentrations, as shown in the first column, of Aquapel 380, Aldo 28 (a monoglyceride stearate) and Aldocet which is an acetylated edible monoglyceride composition. Pertinent data is set forth in the following table:

*Table I*

|  | Casing Produced (lb.) | Emus'n Used (ml.) | Solid Used, gm. | gm. Solid/sq. ft. of Casing | Percent Solid |
|---|---|---|---|---|---|
| Fibrous Casing Size 5=(casing weight 6.55 gm./sq. ft.) | | | | | |
| A. 3% Aldo-28 | 20.2 | 800 | 24.0 | 0.0222 | 0.2617 |
| B. {Aldocet | 23.0 | 800 | {16.0 | 0.0130 | 0.1532 |
| {1% Aldo-28 | | | {8.0 | 0.0065 | 0.0766 |
| C. 0.5% Aquapel-380 | 22.0 | 600 | 3.0 | 0.00254 | 0.0300 |
| Fibrous Casing Size 6=(casing weight 8.04 gm./sq. ft.) | | | | | |
| A. 3% Aldo-28 | 43.4 | 2,000 | 60.0 | 0.0264 | 0.304 |
| B. {2% Aldocet | 40.0 | 2,000 | {40.0 | 0.0190 | 0.222 |
| {1% Aldo-28 | | | {20.0 | 0.0095 | 0.1107 |
| C. 1% Aquapel-380 | 43.6 | 1,500 | 15.0 | 0.00659 | 0.0758 |
| Fibrous Casing Size 7=(casing weight 9.03 gm./sq. ft.) | | | | | |
| A. 3% Aldo-28 | 26.9 | 1,900 | 57.0 | 0.0300 | 0.340 |
| B. {2% Aldocet | 36.6 | 2,230 | {44.6 | 0.0236 | 0.2684 |
| {1% Aldo-28 | | | {22.3 | 0.0118 | 0.1342 |
| C. 0.5% Aquapel-380 | 31.4 | 1,700 | 8.5 | 0.00480 | 0.05507 |

The casings described in Table I were stuffed out and processed to produce spiced luncheon loaf, cotto, and bologna.

The effectiveness of the coatings was evaluated by establishing comparative data on peelability, the adhesion of the casing to the encased finished sausage being measured using a model Serial No. 325 Dillon tester. The following data are in terms of pounds or fractions of pounds of force required to remove a strip of casing ½ inch wide from the surface of the processed sausage item, the data being listed below in Table II:

*Table II*

Spiced luncheon loaf, size No. 5:     Pound
   A _____ ¾–1.
   B _____ ½–¾.
   C (1) _____ 0–⅛.
   D _____ 1.

Cotto, size No. 7:
   A _____ ⅛.
   B _____ ¼.
   C (1) _____ 0–⅛.
   D _____ ¼–½.

Bologna, size No. 6:
   A _____ ¼.
   B _____ ¼.
   C (2) _____ 0–⅛.
   D _____ ¼–¾.

Bologna, size No. 6:
   A _____ ⅛–¼.
   B _____ ⅛–¼.
   C (2) _____ 0–⅛.
   D _____ ¼.

See footnotes at end of table.

*Table II—Continued*

Bologna, size No. 5:
- A ½.
- B ½.
- C (1) 0–⅛.
- D No reading.

Bologna, size No. 7:
- A ¼–½.
- B ¼–½.
- C (1) ¼ (casing split during processing).
- D No reading.

Bologna, size No. 7:
- A ¼–½.
- B ¼.
- C (1) 0–⅛.
- D ¼–½.

Bologna, size No. 7:
- A ⅛–¼.
- B ¼.
- C (1) 0–⅛.
- D ¼.

¹ 0.5% solution ketene dimer (Aquapel 380).
² 1.0% solution ketene dimer (Aquapel 380).

In the table, A, B and C correspond to the similarly identified casings of Table I; D was a standard fibrous casing.

In every case where part C was tested the edges of the casing would start to curl up immediately after the slits were made. It was then possible to peel the casing easily and with no adhesion of meat to the casing. This was not possible with any of the other products tested.

Another application technique by means of which a coating of ketene dimer can be applied to the inside of a casing, is by applying such coating to the inside of fibrous casing as the latter is being produced in accordance with well known procedures. Fibrous casing is made by passing a ribbon of paper around a mandrel to form a tube, applying viscose to the outside surfaces of the paper tube and inbetween the overlapped portion thereof which is to become a seam, and then passing the tube down through a coagulating bath containing acid wherein regeneration of the viscose takes place, then washing and drying the tube according to the procedures described for, example, in U.S. Patents No. 1,937,225; and 2,045,349.

Referring to FIGURE 2 of the drawings a ribbon of paper 11, of the type described in U.S. Patent No. 2,045,349, and which is preferably a long fiber hemp paper weighing 12½ lbs. per ream, passes from roll 12 over rollers 13 and 14 and around formers 15 and 16 which form the paper into tubular form then proceeds downwardly over the mandrel 17. Mandrel 17 which may be a steel pipe having an outside diameter of 2 to 7 inches, more or less, depending on the size of the tube or casing which is to be produced, may be of any suitable length, conveniently about 30 feet long, and, as shown, can be suspended from a suitable support such as an "I beam" 18 or the like. The paper 11, now shaped in the form of a tube, passes downwardly over the mandrel 17, through a forming ring 19 which is a metallic ring having an inside diameter slightly larger than the diameter of the tube-shaped paper passing through it, and whose purpose it is to maintain the paper in tubular form until it reaches the coating die 21. Coating die 21 is essentially a hollow ring structure made of metal or the like and contains an annular opening 22 circumferentially of its inside diameter through which viscose, which is contained under positive pressure in the chamber of the die 21, is applied to the outer surfaces of the downwardly moving paper tube to uniformly coat it with viscose. A sleeve 33 formed of metal or the like which is shrunk onto the mandrel 17 functions to effect more uniform application of viscose through the orifice 22 as the paper 11, passes downwardly thereover.

A number of slip rings 22a which may be shrunk onto the mandrel 17 every three feet or thereabouts, and which are made of metal or the like, serve to keep the inside wall of the viscose-impregnated paper tube from scraping against the outside wall of the mandrel 17, as the tube moves downwardly.

Continuing in its downward movement the viscose-impregnated paper tube enters a coagulating bath 23 of 5% sulfuric acid contained in a suitable vessel 24. On being contacted with the acid, conversion of the viscose to regenerated cellulose begins and continues as the tube moves around the roller 25, over and under wiper rods 26 and 27, roller 28 and then through washing baths and drying tunnels not shown here, but being similar to those used in the art of making regenerated cellulose casings as exemplified in U.S. Patent 1,937,225 and related patents.

Acid for the bath 23 is supplied through pipe 29. The same kind and concentration of acid is supplied through the inside of the mandrel 17 through a pipe 31, spent acid being removed through pipe 32, at a rate which is balanced by the incoming acid, as shown. The speed of the casing in its downward movement is approximately 20 feet per minute and the contact time in the bath 23 is of the order of 50 seconds.

In applying the coating of ketene dimer to the inside of casing such as that described above I incorporate the ketene dimer with the inlet acid which enters at pipe 31 as shown, preferably using the commercial product Aquapel 380, the concentration being conveniently from about 0.1% to 1.0% based on the acid solution.

Besides the foregoing techniques for applying coating of ketene dimer to the inside surfaces of casing, such coating can also be applied to the surface or surfaces of cellulosic sheets themselves before they are formed into tubes. For example, sheets of cellulose impregnated fibrous sheeting can be treated in accordance with the present invention by applying to the surface thereof ketene dimer from a solution, suspension or emulsion in amount sufficient to uniformly coat the surface. After such treatment, the sheeting can be formed into a tube by any conventional technique; ketene dimer coating being applied to the sheet after it has been impregnated with cellulose, and conveniently by putting the coating material in a bath through which the sheet passes prior to being dried. It can also, of course, be applied to the sheet after the sheet has been washed and dried.

It is seen from the above that the technique of the present invention results in the production of highly and unexpectedly superior fibrous and other casings with respect to the performance characteristics of such casings when used as containers for sausage items which are designed for "pre-sliced" packaging. The application is simple and lends itself to easy adaptation within the well-known commercial fiabrication of fibrous casing; it involves the use of extremely small amounts of materials which are relatively easy to apply and which are surprisingly effective for the purpose of this invention, and which do not adversely affect desirable permeability characteristics of the casing with respect to moisture vapor, smoke, dyeing and the like.

While I have particularly described the applicability of this invention to the treatment of regenerated cellulose and fibrous casings, it will be seen that it is also applicable to coating the inside surfaces of such products as regenerated cellulose casing and fibrous casing whose outside surfaces are coated with Saran, casings coated on the outside with polymer compositions such as the casings described in U.S. Patent No. 2,812,259 to Arthur Mark, U.S. Patent No. 2,627,471 and 2,627,483 to Laurence E. Dowd, Naturine casings, fibrous alginate casings, and the like.

It is, of course, to be understood that the foregoing examples are illustrative only and are not to be construed This application is a continuation-in-part of my copending application Serial No. 639,435, filed February 11, 1957, now abandoned.

I claim:
1. In the production of sausage wherein sausage emulsion is stuffed into fibrous casing, the improvement which comprises contacting the inner walls of said casing, prior to stuffing, with an aqueous emulsion of a higher organic ketene dimer to form a reaction product of ketene dimer and the components of the cellulose surface of said fibrous casing, which prevents adhesion of the sausage to the thus treated inner walls of said casing, said ketene having at least 6 carbon atoms and having attached to the >C=C=O group only members of the class consisting of hydrogen, monoalkyl, monoaryl, dialkyl, diaryl, arylalkyl, mono-alicyclic and di-alicyclic radicals.

2. The method of claim 1 wherein the said aqueous emulsion has an alkaline pH of up to about 8.0.

3. A method for preventing adhesion of fibrous casing to sausage contained therein which comprises contacting the inner walls of said casing, prior to stuffing with sausage emulsion, with an aqueous emulsion of a higher organic ketene dimer, said ketene having at least 6 carbon atoms and having attached to the >C=C=O group only members of the class consisting of hydrogen, monalkyl, monoaryl, dialkyl, diaryl, arylalkyl, mono-alicyclic and di-alicyclic radicals.

4. A meat casing having those of its surfaces which are designed to be in contact with encased meat, integrated with a higher organic ketene dimer, said ketene having at least 6 carbon atoms and having attached to the >C=C=O group only members of the class consisting of hydrogen, monoalkyl, monoaryl, dialkyl, diaryl, arylalkyl, mono-alicyclic and di-alicyclic radicals.

5. A cellulosic meat casing having at least the inner surfaces thereof integrated with a higher organic ketene dimer, said ketene having at least 6 carbon atoms and having attached to the >C=C=O group only members of the class consisting of hydrogen, monoalkyl, monoaryl, dialkyl, diaryl, arylalkyl, monoalicyclic and di-alicyclic radicals.

6. A fibrous casing having its inner surfaces reacted with a higher organic ketene dimer so that about 0.01–0.2%, based on the weight of the casing, is retained thereon, said ketene having at least 6 carbon atoms and having attached to the >C=C=O group only members of the class consisting of hydrogen, monoalkyl, monoaryl, dialkyl, diaryl, arylalkyl, monoalicyclic and di-alicyclic radicals.

7. As an article of manufacture a fibrous casing whose interior wall surfaces have been contacted with an aqueous emulsion of a higher organic ketene dimer composition to effect a reaction between the ketene dimer and the cellulosic side walls, said ketene having at least 6 carbon atoms and having attached to the >C=C=O group only members of the class consisting of hydrogen, monalkyl, monoaryl, dialkyl, diaryl, arylalkyl, mono-alicyclic and di-alicyclic radicals.

8. A regenerated cellulose meat casing containing cellulosic fibers, at least the inner surface of which has been subjected to the action of an emulsion of a dimer of a higher organic ketene, said ketene having at least six carbon atoms and having attached to the >C=C=O group only members of the class consisting of hydrogen, monoalkyl, monoaryl, dialkyl, diaryl, arylalkyl, mono-alicyclic and di-alicyclic radicals.

9. A regenerated cellulose meat casing containing cellulosic fibers, at least the inner surface of which has been subjected to the action of an aqueous emulsion of a dimer of a higher alkyl ketene, said ketene having from 6 to 20 carbon atoms and having attached to the

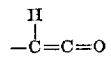

group an alkyl radical.

10. A regenerated cellulose meat casing containing cellulosic fibers, at least the inner surface of which has been subjected to the action of an aqueous emulsion of a higher alkyl ketene dimer, said ketene having from 6 to 20 carbon atoms and having attached to the >C=C=O group only alkyl radicals.

11. A meat casing having the inner surfaces coated with a dimer of a ketene having the formula

RCH=C=O wherein R is a monoalkyl radical containings 16 to 18 carbon atoms.

12. A cellulosic meat casing having substantially its entire inner surface reacted with a dimer of a ketene having the formula RCH=C=O wherein R is an alkyl radical containing 16 to 18 carbon atoms.

References Cited in the file of this patent
UNITED STATES PATENTS

| | | |
|---|---|---|
| 2,627,477 | Downey | Feb. 3, 1953 |
| 2,709,138 | Weingand et al. | May 24, 1955 |
| 2,762,270 | Keim et al. | Sept. 11, 1956 |

UNITED STATES PATENT OFFICE
CERTIFICATE OF CORRECTION

Patent No. 3,106,471　　　　　　　　　　　　　　　October 8, 1964

John W. Firth

It is hereby certified that error appears in the above numbered patent requiring correction and that the said Letters Patent should read as corrected below.

Column 1, line 63, after "that" insert -- this --; column 2, line 49, before "water" insert -- a --; column 4, Table 1, first column, line 3 thereof, before "Aldocet" insert -- 2% --; column 6, line 54, for "fiabrication" read -- fabrication --.

Signed and sealed this 17th day of November 1964.

(SEAL)
Attest:

ERNEST W. SWIDER
Attesting Officer

EDWARD J. BRENNER
Commissioner of Patents